OUTPUT OF AMPLITUDE DETECTOR

OUTPUT OF BOXCAR CIRCUIT

United States Patent Office

2,988,739
Patented June 13, 1961

2,988,739
MONOPULSE RADAR SYSTEM
William G. Hoefer, Syracuse, and Donald H. Kuhn, North Syracuse, N.Y., assignors to the United States of America as represented by the Secretary of the Army
Filed Nov. 18, 1958, Ser. No. 774,793
5 Claims. (Cl. 343—16)

This invention relates to radar tracking systems and more particularly to monopulse type radar systems.

In the various types of monopulse systems, gain and phase differences between the sum signal and difference signal receiver channels have a harmful effect upon the operation of the system. The sum signal, Σ, is the summation of the signal from the full antenna aperture and is used for radar range measurements and as a signal reference. In the combination amplitude-phase comparison system, the difference signal Δ, is made up of vertical and horizontal error components. The resultant error signal is amplified in the ΔIF amplifier and the vertical and horizontal components separated out in phase detector circuit. The azimuth error voltage component results from the phase difference $\phi$ of the Σ and Δ signal and is in time quadrature with the sum signal. The elevation error signal results from the difference in magnitude of the target signals off the boresight axis and is in time phase with the sum signal. In the phase-comparison system and in the amplitude-comparison system, phase shift between channels can cause a shift of the boresight due to the fact that the hybrid comparison circuit never has a complete null on the boresight. In addition, the accuracy of the error signals, usually designated as error correction signals and abbreviated ECS, is affected by phase and gain differences in the sum and delta receiving channels. In the combination amplitude-phase comparison system, the boresight axis is not affected, but the accuracy of error signal is seriously affected by both phase and gain differences in the receiver channels. Although the advantages of stabilizing gain and phase shift in the two separate channels are well known, the requirements for such stability are difficult to satisfy. Heretofore, such difficulties were met by designing the system components so as to keep the gain and phase differences to a minimum, and to provide adjustments which must be checked frequently. Another alternative is to provide a monitoring system which continuously measures and corrects the gain and phase differences between channels. Both of these methods, however, add a great deal of complexity to the system.

It is an object of the present invention to provide an improved monopulse radar system wherein the aforementioned difficulties are overcome.

It is another object of the present invention to provide an improved monopulse radar system wherein the effects of gain and phase difference between respective IF systems in the receiver channels are greatly minimized.

In the description below the term "phasor" refers to complex quantities as defined on page 11 of "General Network Analysis," by Le Page and Seely, published by McGraw-Hill Book Company (1952).

In accordance with the present invention there is provided a combination amplitude-phase comparison monopulse radar system having means responsive to detected pulse signals whereby there is produced a phasor sum signal and a phasor difference signal having a prescribed angle with respect to the sum signal, which said difference signal is a measure of the deviation of the target from the boresight axis of the system. Included are a first heterodyning frequency source and means responsive to the first heterodyning frequency whereby there is produced a second heterodyning frequency which differs from the first heterodyning frequency by a prescribed audio frequency. Included further are means for generating a reference signal at the audio frequency, a first mixer responsive to the sum signal and the first heterodyning frequency for producing a sum IF signal at a prescribed IF frequency, and a second mixer responsive to the difference signal and the second heterodyning frequency for producing a difference IF signal at a frequency which differs from the prescribed IF frequency by the prescribed audio frequency. In addition, there is included means for additively combining the sum and difference IF signals whereby there is produced a component of the prescribed IF frequency which includes the sum signal and the difference signal, which combined component is amplitude modulated by a signal having a frequency equal to the audio frequency but shifted in phase by the prescribed phase angle. Also included are means responsive to the output of the adding means for recovering the envelope of the amplitude modulated difference signal whereby there is produced a signal at the audio frequency but shifted in phase with respect to the audio reference signal by the prescribed phase angle and means for comparing the reference audio signal and the audio frequency signal including the phase angle whereby the components of said audio frequency signal which are in-phase and in-quadrature-phase with the audio reference signal are separately detected.

For a better understanding of the present invention, together with other and further objects thereof, reference is had to the following description taken in connection with the accompanying drawing in which.

Figure 1:
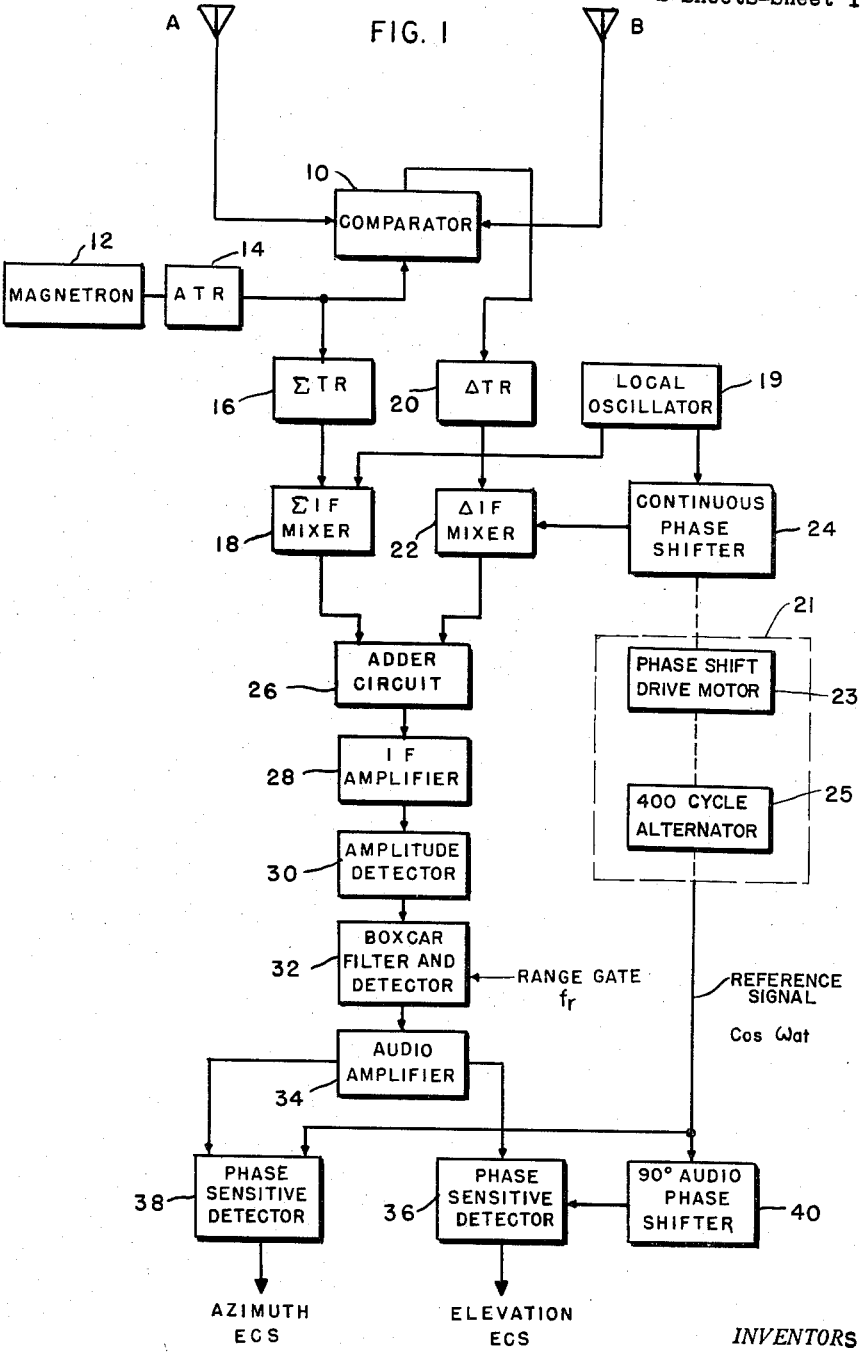
FIG. 1 is a block schematic diagram of the monopulse system.

Referring now to FIG. 1 of the drawing, A and B schematically represent the two antennas of a combination amplitude-phase comparison monopulse radar system. Physically the antennas are placed side by side in a horizontal plane, but tilted, one up and one down, in the vertical plane. A complete description of the antenna arrangement in the combination amplitude-phase comparison monopulse radar system is disclosed in the copending application of George M. Kirkpatrick for "Improved Monopulse Radar System," Serial Number 677,181. The antennas A and B are each coupled to a balanced duplexer or waveguide hybrid comparator circuit 10. Such balanced duplexer circuits are well known in the art and fully described in U.S. Patent No. 2,445,895, dated July 27, 1948. The comparator circuit 10 permits power fed from a pulsed transmitter magnetron 12 through a conventional ATR circuit 14 at a prescribed PRF, $f_r$, to be radiated in the same phase from antennas A and B, but the received echo pulse detected by each of the antennas is combined in the comparator circuit 10 to produce discrete sum and difference phasor signals designated by the symbols Σ and Δ, respectively. It is to be understood, of course, that the magnetron transmitter 12 is being pulsed at a prescribed PRF designated $f_r$. If the respective signals at the antenna for a target echo are assumed to be $E_A$ and $E_B$ then the output from comparator circuit 10 will provide sum signal $$\Sigma = \frac{1}{\sqrt{2}}(E_A + E_B)$$

and difference signal $$\Delta = \frac{1}{\sqrt{2}}(E_A - E_B)$$

As phasor quantities, the sum and difference signals may be represented by Σ and $\Delta e^{j\phi}$, where $\phi$ is the angle corresponding to the phase shift of the difference channel with respect to the sum channel. Since the frequency of the sum and difference signals at the output of comparator 10 is the same as that as the transmitted frequency, hereinafter referred to as $\omega_1$, the respective sum and difference signals may be designated as $\Sigma \cos \omega_1 t$ and $\Delta \cos (\omega_1 t + \phi)$. The sum signal $\Sigma \cos \omega_1 t$ is applied through $\Sigma$TR tube 16 to $\Sigma$IF mixer circuit 18 where it is heterodyned with the output frequency from local oscillator 19 to produce a sum IF phasor signal having a frequency $\omega_2$ and hereinafter referred to as $\Sigma \cos \omega_2 t$. The difference signal $\Delta \cos (\omega_1 t + \phi)$ is applied through $\Delta$TR tube 20 to $\Delta$IF mixer circuit 22 where it is heterodyned with a signal which differs from that derived from local oscillator 19 by an audio frequency $\omega_a$, which is less than one-half the pulse repetition frequency $f_r$ at which the magnetron transmitter is pulsed, and chosen so that the two heterodyning frequencies are only a few hundred cycles apart. The heterodyning signal applied to $\Delta$IF mixer circuit 22 is produced in the following manner. The output of local oscillator 19 is applied as the incident wave to a rotary type phase shifter 24 whose output is applied as the heterodyning frequency to mixer circuit 22. One such phase shifter well known in the art is described in volume 8 of the MIT Radiation Laboratory Series (1948), "Principles of Microwave Circuits," pages 355–358. It consists of a length of round waveguide having a rotatable section, such that a signal propagating through the waveguide, experiences a phase shift linearly proportional to the angular position of the rotating section. The rotating section is continuously and linearly driven by any suitable means to produce a linear phase shift of the R.F. signal at the audio rate $\omega_a$ so that with an input from local oscillator 19 the output from phase shifter 24 will be a heterodyning signal whose frequency is constant and differs from the local oscillator 19 frequency by the audio frequency $\omega_a$. Thus, by this arrangement the output of phase shifter 24 will heterodyne with the difference signal $\Delta \cos (\omega_1 t + \phi)$ in $\Delta$IF mixer circuit 22 to produce a difference IF phasor signal having a frequency $\omega_2 + \omega_a$, where $\omega_2$ is the $\Sigma$IF frequency, and hereinafter designated as $$\Delta \cos [(\omega_2 + \omega_a)t + \phi]$$

The mechanical rotation of the shaft which drives the rotary section of phase shifter 24 is converted to an audio frequency signal $\cos \omega_a t$ by any suitable means well known in the art. As an example, one such means may comprise a motor alternator set 21 wherein the phase shifter drive motor 23 also drives the shaft of a 400 cycle output alternator 25, the output of which as herebelow described will provide an audio reference signal for the system. Such motor alternator sets are described in volume 1 of the MIT Radiation Laboratory Series (1948), "Radar System Engineering," pages 557–563. It is to be understood, of course, that any other suitable phase shifter, a ferrite type for example, may be utilized to produce the heterodyning signal applied to $\Delta$IF mixer 22.

As shown, the output signals from $\Sigma$IF mixer circuit 18 and $\Delta$IF mixer circuit 22 are added together in a suitable adder circuit 26 and the signal output therefrom is applied to the input of IF amplifier 28. Since the $\Sigma$IF pulses from mixer circuit 18 and the $\Delta$IF pulses from mixer circuit 22 are at different frequencies, they can be added together for amplification in IF amplifier 28, and, with the two signal outputs from $\Sigma$IF mixer 18 and $\Delta$IF mixer 22 only a few hundred cycles apart, there is litle chance for relative phase shift to occur, since the band pass of the IF amplifier is normally very large compared to the frequency difference of the two signals, which is $$f_a = \frac{\omega_a}{2\pi}$$

Figure 3:
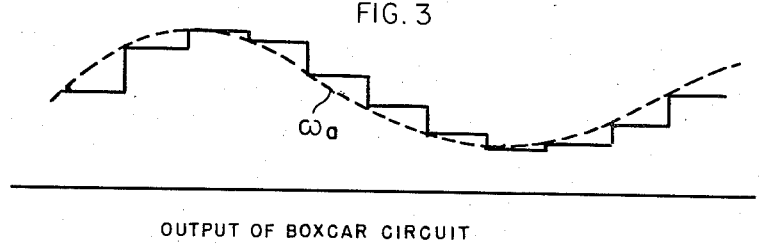

The amplified output from IF amplifier 28 is applied to a conventional amplitude detector 30 which includes means for filtering out the IF frequency $\omega_2$. Thus the output from detector 30 consists of video pulses modulated by the delta signal varying at the audio rate $\omega_a$, which as hereinafter explained, is the difference signal component which is separated out and used for tracking. The detected modulated output from detector 30 is applied as one input to a conventional box-car generator or demodulator circuit 32 which functions in a manner to stretch the video pulses from a target from one pulse repetition period to the next. As is well known, the box-car generator 30 consists of an electrical circuit that clamps the potential of a storage element, a capacitor for example, to the video pulse amplitude each time the pulse is received. At all times between pulses, the storage element maintains the potential of the preceding pulse and is altered only when a new video pulse is produced whose amplitude differs from that of the previous one. As shown, there is also applied to the box-car circuit 30 a range gate input at the repetition frequency $f_r$ so that the box-car circuit 32 also acts simultaneously as a gating circuit to select the range element containing the target. The flat, step-like segments of the voltage output from box-car circuit 32 is shown in FIG. 3. This output is, in effect, a reconstruction of the envelope of the modulated pulse and it furnishes a large audio amplification plus a type of filter action that completely suppresses the PRF and all its harmonics. The stretching action of box-car circuit 32 thus acts to amplify the desired difference audio frequency component $\omega_a$ and reduce the undesired harmonics. The output of box-car circuit 32 is applied to an audio filter and amplifier circuit 34 which filters out the unwanted cross-products in the output from box-car circuit 32 so that only the audio frequency $\omega_a$ is derived from the output of audio filter and amplifier circuit 34. As will be explained below, the audio frequency $\omega_a$ output from box-car circuit 32 and audio amplifier 34 has a phase angle with respect to the audio reference signal equal to the phase angle difference between the sum and difference signals, $\phi$, and has an amplitude proportional to the amplitude of the difference signal. As shown, the audio signal $\cos \omega_a t$ is applied to phase sensitive detector 36 through a 90° phase shifter circuit 40 so that the audio reference signals at frequency $\omega_a$ applied to the phase sensitive detectors are shifted 90° with respect to each other. In this manner the output of the phase-sensitive detector 36 will provide the elevation ECS and the output of phase sensitive detector 38 will provide the azimuth ECS. Each phase sensitive detector is insensitive to a quadrature component. The audio frequency $\omega_a$ chosen may be 400 cycles so that it could readily be used for an A.C. servo system adapted to operate at an error frequency of 400 cycles.

Although the monopulse system shown in FIG. 1 is shown as a pulsed system, for purposes of clarity in explaining the operation of the system it will be considered as a C.W. radar. The principle of operation is the same for both cases but in this way the necessity for more complex expressions may be eliminated. The operation of the circuitry from the antennas A and B to the $\Sigma$IF mixer 18 and $\Delta$IF mixer 22 is conventional and hence no further explanation thereof is believed necessary. As hereinabove described, the signal outputs from $\Sigma$IF mixer 18 and $\Delta$IF mixer 22 differ in frequency by the audio frequency $\omega_a$. Hence, if the $\Sigma$IF output signal is considered to be a C.W. signal at IF frequencies of $\omega_2$ then $$\Sigma \cos \omega_2 t = \text{sum signal } \Sigma IF \quad (1)$$

and $$\Delta \cos[(\omega_2 + \omega_a)t + \phi] = \text{difference signal } \Delta IF \quad (2)$$

The phase angle $\phi$ of course is necessary because the difference signal originates from a combination pulse-amplitude comparison system. Since the $\Sigma$IF signals and the $\Delta$IF signals derived from mixers 18 and 22 are at slightly different frequencies, they can be added together and simultaneously amplified in single IF amplifier 28. The added signal input to IF amplifier 28 is the sum of Equations 1 and 2 and may be expressed as $$S_{\text{Total}} = \Sigma \cos \omega_2 t + \Delta \cos (\omega_2 + \omega_a) t + \phi \quad (3)$$

If the sum signal of Equation 3 were observed on an oscilloscope, the two components would appear to "beat" together at the audio rate of $\omega_a$. This beat is sampled by the PRF, $f_r > 2\omega_a$ since the actual signals in IF amplifier 28 are pulses, and reconstructed by the non-linear action of the detector circuits. The beat contains the desired angle information and is recovered by the action of amplitude detector 30 and box-car circuit 32. Mathematically the presence of the beat can be shown in connection with Equation 3. By utilizing well known trigonometric relationships, Equation 3 can be expressed as $$[\Sigma + \Delta \cos (\omega_a t + \phi)] \cos \omega_2 t - [\Delta \sin (\omega_a t + \phi)] \sin \omega_2 t \quad (4)$$

Figure 2:
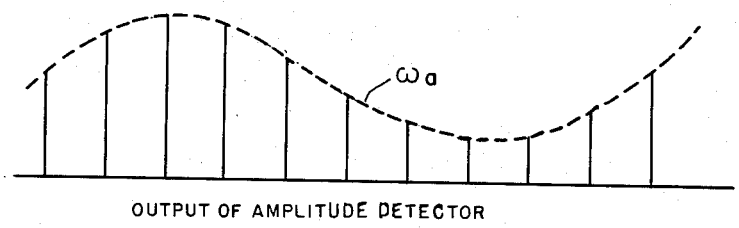
FIGS. 2 and 3 are explanatory curves.

The first term represents an amplitude modulated component which contains the desired angle information and the second term represents a phase modulated component having the desired angle information, both components having the audio modulation frequency $\omega_a$. The amplitude detector 30 recovers the amplitude modulation component and is insensitive to the phase modulation component. The resultant output of detector 30 is shown in FIG. 2. The box-car circuit and filter, due to the action hereinabove described, reconstructs the envelope of the modulated pulse as shown in FIG. 3 to produce a final output given by $$\Sigma + \Delta \cos (\omega_a t + \phi) \quad (5)$$

The box-car output signal of Equation 5 is applied as one input to each of the phase sensitive detectors 36 and 38 to which are also applied respectively audio reference signals $\cos \omega_a t$ and $\sin \omega_a t$, the latter reference signal being developed by applying the $\cos \omega_a t$ reference signal through 90°-phase shifter 40 before it is applied to phase sensitive detector 36. By this arrangement, the output of phase sensitive detector 38 will produce an azimuth ECS proportional to $\Delta \sin \phi$ while phase sensitive detector 36 will produce an elevation ECS proportional to $\Delta \cos \phi$.

Although the monopulse system described above is that of the combination phase-amplitude comparison system, it is to be understood that the same may be used with single coordinate amplitude-comparison systems or phase-comparison systems. The system hereinabove described eliminates the effects of phase and gain difference in the IF systems and also has the further advantage in that amplification and phase detection of the error signal is done at the audio frequency thereby resulting in simpler and more stable circuitry, and the error signals are not subject to D.-C. drifts.

While there has been described that is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a combination amplitude-phase comparison monopulse radar system having means responsive to detected pulse signals whereby there is produced a phasor sum signal and a phasor difference signal having a prescribed phase angle with respect to said sum signal, which difference signal is a measure of the deviation of the target from the boresight axis of the system, means for detecting the phase angle comprising: a first heterodyning frequency source, means responsive to said first heterodyning frequency for producing a second heterodyning frequency which differs from said first heterodyning frequency by a prescribed audio frequency, means for generating a reference signal at said audio frequency, a first mixer responsive to said sum signal and said first heterodyning frequency for producing a sum IF signal at a prescribed IF frequency, a second mixer responsive to said difference signal and said second heterodyning frequency for producing a difference IF signal at a frequency which differs from said prescribed IF frequency by said audio frequency, means for additively combining said sum and difference IF signals whereby there is produced a component of said prescribed IF frequency which includes said sum signal and a difference signal amplitude modulated by a signal having said audio frequency but shifted in phase by said phase angle, means responsive to the output of said adding means for recovering the envelope of the amplitude modulated difference signal whereby there is produced a signal having said audio frequency but shifted in phase by said phase angle, and means for comparing the reference audio signal and the audio frequency signal including the phase angle whereby the components of said audio frequency signal which are in-phase and in-quadrature-phase with the audio reference signal are separately detected.

2. The system in accordance with claim 1 wherein the second heterodyning frequency producing means comprises a waveguide-type rotary phase-shifter adapted to receive said first heterodyning frequency as the incident energy and having its rotatable member driven at a rate corresponding to said audio frequency.

3. In a combination amplitude-phase comparison monopulse radar system having means responsive to detected pulse signals whereby there is produced a phasor sum signal and a phasor difference signal having a prescribed phase angle with respect to said sum signal, which difference signal is a measure of the deviation of the target from the boresight axis of the system, means for detecting the phase angle comprising: a first heterodyning frequency source, means including a waveguide-type rotary phase shifter responsive to said first heterodyning frequency for producing a second heterodyning frequency which differs from said first heterodyning frequency by a prescribed audio frequency, means for deriving from said phase shifter a reference signal at said audio frequency, means responsive to said first heterodyning frequency and said sum signal for producing a sum IF signal at a prescribed IF frequency, means responsive to said second heterdyning frequency and said difference signal for producing a difference IF signal at a frequency which differs from said prescribed IF frequency by said audio frequency, means for additively combining said sum and difference IF signals whereby there is produced a component of said prescribed IF frequency which includes said sum signal and a difference signal amplitude modulated by a signal having said audio frequency but shifted in phase by said phase angle, means including an amplitude detector and a box-car circuit for recovering the envelope of the amplitude modulated difference signal whereby there is produced a signal having said audio frequency but shifted in phase by said phase angle, and means for comparing the reference signal and the audio frequency signal including the phase angle whereby the components of said audio frequency signal which are in-phase and in-quadrature-phase with the audio reference signal are separately detected.

4. The system in accordance with claim 3 wherein said last mentioned means comprises an audio phase shifter responsive to said reference signal for shifting the phase thereof 90°, and a first and second phase sensitive detector, said first phase detector being responsive to the combined inputs of the audio signal including said phase angle and said reference audio signal, and said second phase detector being responsive to the combined inputs of said audio signal including said phase angle and the phase-shifted reference audio signal.

5. In a combination amplitude-phase comparison monopulse radar system wherein the transmitted microwave frequency energy is pulsed at a prescribed PRF rate, means for producing phasor sum and phasor difference signals at said microwave frequency, a first heterodyning frequency source, means including a waveguide-type rotary phase-shifter responsive to said first heterodyning frequency for producing a second heterodyning frequency which differs from said first heterodyning frequency by a prescribed audio frequency, said audio frequency being less than said PRF rate, means for driving from said phase shifter a reference signal at said audio frequency, a first mixer responsive to said first heterodyning frequency and and said sum signal for producing a sum IF signal at a prescribed IF frequency, a second mixer responsive to said difference signal and said second heterodyning frequency for producing a difference IF signal at a frequency which differs from said prescribed IF frequency by said audio frequency, an adder circuit responsive to said sum and difference IF signals for producing a component of said prescribed IF frequency which includes said sum signal and a difference signal amplitude modulated by a signal having said audio frequency but shifted in phase by said phase angle, means including an amplitude detector and a box-car circuit for recovering the envelope of the amplitude modulated difference signal whereby there is produced a signal having said audio frequency but shifted in phase by said phase angle, and means for comparing the reference audio frequency signal and the audio frequency signal including the phase angle whereby the components of said audio frequency signal which are in-phase and in-quadrature-phase with the audio reference signal are separately detected.

References Cited in the file of this patent
UNITED STATES PATENTS

| | | |
|---|---|---|
| 2,682,656 | Phillips | June 29, 1954 |
| 2,821,701 | Vogeley et al. | Jan. 28, 1958 |